United States Patent
Kim et al.

(10) Patent No.: US 9,209,959 B2
(45) Date of Patent: Dec. 8, 2015

(54) METHOD OF FREQUENCY SYNCHRONIZATION IN DISTRIBUTED NETWORK

(71) Applicant: Electronics and Telecommunications Research Institute, Daejeon (KR)

(72) Inventors: Jung Hyun Kim, Daejeon (KR); Jihyung Kim, Daejeon (KR); Hyun-jae Kim, Incheon (KR); Kwang Jae Lim, Daejeon (KR); DongSeung Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 346 days.

(21) Appl. No.: 13/851,082

(22) Filed: Mar. 26, 2013

(65) Prior Publication Data

US 2013/0250775 A1    Sep. 26, 2013

(30) Foreign Application Priority Data

Mar. 26, 2012  (KR) .................. 10-2012-0030809
Mar. 20, 2013  (KR) .................. 10-2013-0030015

(51) Int. Cl.
| | |
|---|---|
| *H04W 56/00* | (2009.01) |
| *H04W 4/08* | (2009.01) |
| *H04L 7/00* | (2006.01) |
| *H04L 27/00* | (2006.01) |
| *H04L 27/26* | (2006.01) |
| H04J 3/06 | (2006.01) |

(52) U.S. Cl.
CPC .......... *H04L 7/0016* (2013.01); *H04L 27/0014* (2013.01); *H04L 27/2657* (2013.01); *H04L 27/2675* (2013.01); *H04W 56/0035* (2013.01); H04L 2027/0065 (2013.01); H04L 2027/0095 (2013.01)

(58) Field of Classification Search
CPC . H04W 56/00; H04W 56/001; H04W 56/002; H04W 56/0005; H04L 27/2657; H04L 27/2655; H04L 27/2662; H04L 2027/0083; H04L 2027/0026
USPC ........ 370/350, 324, 503, 362; 455/502, 192.1
See application file for complete search history.

(56) References Cited

U.S. PATENT DOCUMENTS

| | | | | |
|---|---|---|---|---|
| 5,970,092 | A  * | 10/1999 | Currivan ....................... | 375/232 |
| 2008/0186950 | A1 | 8/2008 | Zhu et al. | |
| 2009/0207954 | A1* | 8/2009 | Dai et al. ...................... | 375/345 |
| 2009/0232125 | A1* | 9/2009 | Kim et al. .................... | 370/350 |
| 2011/0116481 | A1 | 5/2011 | Wang | |
| 2011/0286376 | A1* | 11/2011 | Yoo et al. ...................... | 370/312 |

OTHER PUBLICATIONS

Hyung-Geun Lim et al., "A Byzantine Fault-tolerant Clock Synchronization Scheme in Wireless Sensor Networks", Journal of Computing Practices and Letters (Korea), vol. 14, No. 5, Jul. 2008, pp. 487-491.

* cited by examiner

*Primary Examiner* — Charles C Jiang
*Assistant Examiner* — Will Lin
(74) *Attorney, Agent, or Firm* — Rabin & Berdo, P.C.

(57) ABSTRACT

A method and apparatus for synchronizing a carrier frequency of a node included in a distributed network are provided. The apparatus includes a frequency offset estimating unit, an offset average value calculating unit, and a frequency adjustment value calculating unit. The method includes receiving preambles from a plurality of nodes adjacent to the node, estimating offsets of the carrier frequencies from the received preambles for each of the plurality of neighbor nodes, calculating an average value of the estimated offsets, calculating an adjustment value of the carrier frequencies with respect to the entirety of the plurality of neighbor nodes by using the average value, and adjusting a carrier frequency of the node on the basis of the adjustment value.

13 Claims, 6 Drawing Sheets

METHOD OF FREQUENCY SYNCHRONIZATION IN DISTRIBUTED NETWORK

CROSS-REFERENCE TO RELATED APPLICATION

This application claims priority to and the benefit of Korean Patent Application Nos. 10-2012-0030809 and 10-2013-0030015 filed in the Korean Intellectual Property Office on Mar. 26, 2012 and Mar. 20, 2013, the entire contents of which are incorporated herein by reference.

BACKGROUND OF THE INVENTION (a) Field of the Invention

The present invention relates to a method of frequency synchronization in a distributed network.

(b) Description of the Related Art

In an orthogonal frequency division multiple access (OFDMA)-based system, a frequency offset may be generated due to a moving speed (or velocity) of each node, an oscillator error, an estimation error, and the like. Such a frequency offset may cause interference between nodes to degrade performance of an overall system.

In particular, in a distributed network in which multiple nodes exist, the respective nodes are to perform synchronization with every node adjacent thereto, and although nodes are synchronized with any one node, they may be interfered with by an unsynchronized node adjacent thereto.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a flexible, organic frequency offset synchronization method having advantages of being applicable to a distributed network.

An exemplary embodiment of the present invention provides a method of frequency synchronization of a node entering a distributed network. The method comprising: receiving preambles from a plurality of neighbor nodes adjacent to the node; estimating offsets of the carrier frequencies from the received preambles, for each of the plurality of neighbor nodes; calculating an average value of the estimated offsets; calculating an adjustment value of the carrier frequencies with respect to the entirety of the plurality of neighbor nodes by using the average value; and adjusting a carrier frequency of the node on the basis of the adjustment value.

An exemplary embodiment of the present invention provides an apparatus for synchronizing a carrier frequency of a node included in a distributed network. The apparatus comprising: a communicating unit configured to receive preambles from a plurality of neighbor nodes adjacent to the node; a frequency offset estimating unit configured to estimate an offset of the carrier frequency from the received preambles for each of the plurality of neighbor nodes; an offset average value calculating unit configured to calculate an average value of the estimated offsets; a frequency adjustment value calculating unit configured to calculate an adjustment value of the carrier frequencies with respect to the entirety of the plurality of neighbor nodes by using the average value; and a frequency adjusting unit configured to adjust a carrier frequency of the node on the basis of the adjustment value.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms such as "-er", "-or", and "module" described in the specification mean units for processing at least one function and operation, and can be implemented by hardware components or software components and combinations thereof.

Figure 1:
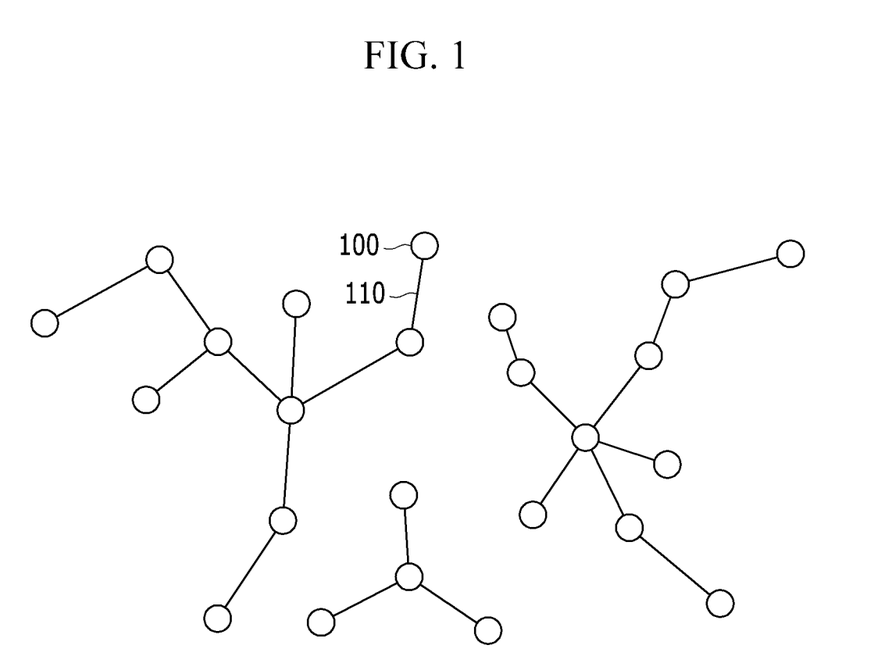
FIG. 1 is a view illustrating a distributed network according to an embodiment of the present invention.

FIG. 1 is a view illustrating a distributed network according to an embodiment of the present invention.

Referring to FIG. 1, a distributed network according to an embodiment of the present invention may include a plurality of nodes 100 connected by a communication link 110. Each node included in the distributed network synchronizes a frequency by using preambles received from adjacent nodes. Here, a period for updating frequency synchronization of each node may be set in consideration of a number of adjacent nodes. Alternatively, the period for updating frequency synchronization may be fixed as a predetermined value or may be defined by the number of times of receiving preambles from adjacent nodes.

Figure 2:
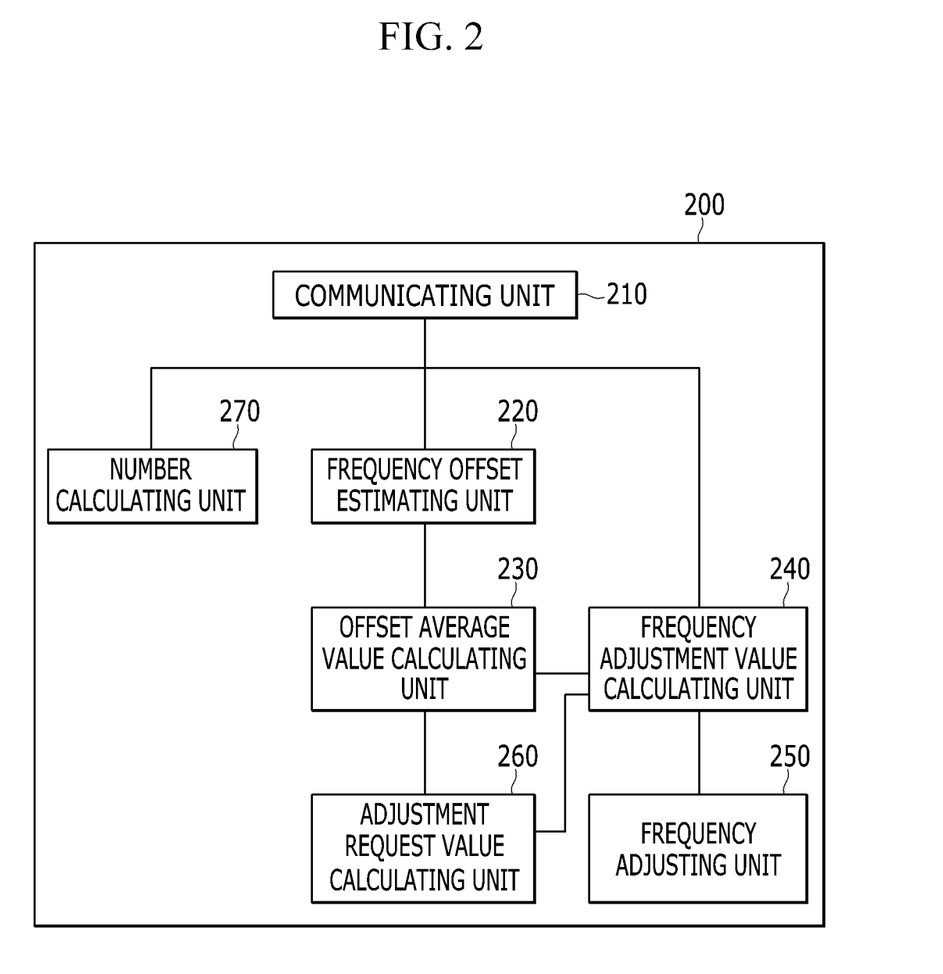
FIG. 2 is a block diagram of an apparatus for synchronizing a carrier frequency according to an embodiment of the present invention.
Figure 3:
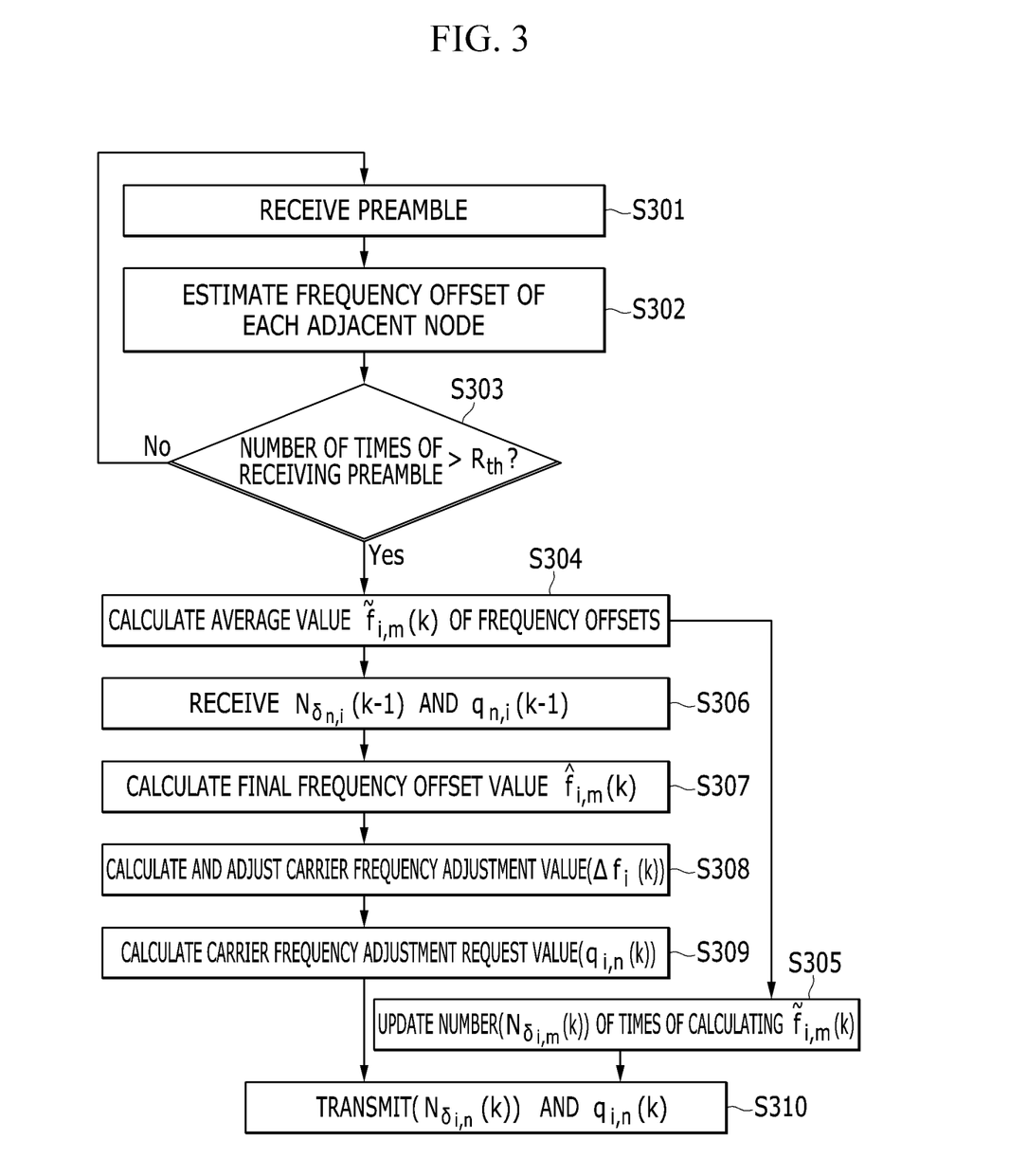
FIG. 3 is a flowchart illustrating a process of synchronizing a frequency performed in a node i at a kth update time according to an embodiment of the present invention.

FIG. 2 is a block diagram of an apparatus for synchronizing a carrier frequency according to an embodiment of the present invention, and FIG. 3 is a flowchart illustrating a process of synchronizing a frequency performed in a node i at a k-th update time according to an embodiment of the present invention.

Referring to FIG. 2, an apparatus 200 for synchronizing a carrier frequency according to an embodiment of the present invention may include a communicating unit 210, a frequency offset estimating unit 220, an offset average value calculating unit 230, a frequency adjustment value calculating unit 240, and a frequency adjusting unit 250. Also, the apparatus 200 may further include an adjustment request value calculating unit 260 and a number calculating unit 270.

The communicating unit 210 receives a preamble from a different node in the distributed network and transmits a preamble to the different node. Also, the communicating unit 210 may transmit and receive various parameters (the number ($N_\delta(k)$) of times of calculating an average value of frequency offsets), a carrier frequency adjustment request value (q(k)), and the like generated during a process of synchronizing a carrier frequency. Whether to transmit and receive various parameters may be determined according to overhead required in performing an algorithm according to an embodiment of the present invention in each node.

The frequency offset estimating unit 220 estimates frequency offsets of respective nodes by using preambles received from the respective nodes in the distributed network. Namely, the frequency offset estimating unit 220 may estimate frequency offsets by the number of times of receiving the preambles for each node.

The offset average value calculating unit 230 calculates an average value of the frequency offsets estimated for each node in the distributed network. When the frequency offset estimating unit 220 estimates frequency offsets with respect to a particular node in the distributed node several times, the offset average value calculating unit 230 may calculate an average value of the frequency offsets estimated for each node.

The frequency adjustment value calculating unit 240 calculates a frequency adjustment value of the node on the basis of the average value of the frequency offsets calculated by the offset average value calculating unit 230. Meanwhile, the frequency adjustment value calculating unit 240 may use various parameters received from the communicating unit to calculate the frequency adjustment value.

The frequency adjusting unit 250 adjusts a frequency of the node including the apparatus for synchronizing a carrier frequency on the basis of the frequency adjustment value calculated by the frequency adjustment value calculating unit 240.

Also, the adjustment request value calculating unit 260 arithmetically operates the frequency adjustment value calculated by the frequency adjustment value calculating unit 240 and the average value of the frequency offsets calculated by the offset average value calculating unit 230 to calculate a frequency adjustment request value to be transmitted to a different node.

Further, the number calculating unit 270 updates the number of times of calculating an average value of frequency offsets and transmits the updated number of times of calculating an average value to the communicating unit 210 so that the number of times of calculating an average value of frequency offsets can be transmitted to a different node. Meanwhile, in order to lower overhead of an algorithm, if the number of times of calculating an average value exceeds a predetermined number, the number calculating unit 270 may fix the number of times of calculating an average value to a constant number.

Hereinafter, a process of frequency synchronization of a node which has entered the distributed network will be described with reference to FIG. 3 and a pseudocode 1 shown below <Pseudocode 1>

1: for every $m \in \zeta_i$ do
2:
$$\text{Calculate } \tilde{f}_{i,m}(k) = \frac{\sum_{r=1}^{R_m} \hat{f}_{i,m}^{[r]}(k)}{R_m}$$
3: Update $N_{\delta_{i,m}}(k) = N_{\delta_{i,m}}(k-1) + 1$
4: end for
5: for every $n \in \xi_i$ do
6: Calculate $\hat{f}_{i,n}(k) = (1 - \delta_{n,i}(k)) \times \tilde{f}_{i,m}(k) + \delta_{n,i}(k) \times (q_{n,i}(k-1) - \Delta f_i(k-1))$
7: end for
8:
$$\text{Calculate } \Delta f_i(k) = \frac{\sum_{n \in \xi_i} \hat{f}_{i,n}(k)}{N_{\xi_i} + 1}$$
9: for every $n \in \xi_i$ do
10: Calculate $q_{i,n}(k) = \Delta f_i(k) - \hat{f}_{i,n}(k)$
11: end for In pseudocode 1, a node i is a node performing frequency synchronization according to an embodiment of the present invention.

First, whenever preambles are received from nodes included in a set $\zeta_i$ (S301), the node i primarily estimates frequency offsets with respect to the node included in the set $\zeta_i$ (S302). Here, the set $\zeta_i$ is a set of nodes which have transmitted preambles received more than a number of times ($R_{th}$) previously determined in the node i, among nodes adjacent to the node i. In an embodiment of the present invention, a node included in the set $\zeta_i$ is called a 'node m'.

$\hat{f}_{i,m}^{[r]}(k)$ is a value obtained by temporarily estimating, by the node, a frequency offset with respect to the node m from an r-th preamble received from the node m.

Thereafter, based on the number of times ($R_m$) the node i has received preambles from the node m until then, the node i calculates an average value of the primarily estimated offset values. Namely, the average value $\tilde{f}_{i,m}(k)$ of the primarily estimated offset values is a value obtained by finally estimating the frequency offsets of the node m after the node i receives preambles from the node m $R_m$ ($R_m \geq R_{th}$) times (S304).

Thereafter, the node i updates the number of times of calculating an average value of the frequency offsets with respect to the node m until a k-th updating point in time (S305). In the pseudocode 1, the number ($N_{\delta_{i,m}}(k)$) of times of calculating, by the node i, an average value of frequency offsets with respect to the node m is $\zeta_i$.

Thereafter, the node i receives $q_{n,i}(k-1)$ and $N_{\delta_{n,i}}(k-1)$ from a node included in the set $\xi_i$ (S306). Here, the set $\xi_i$ is a set of nodes which have transmitted a carrier frequency adjustment request value ($q_{n,i}(k)$) received by the node i, among the nodes included in the set $\zeta_i$.

In an embodiment of the present invention, a node included in the set $\zeta_i$ is a 'node n', $q_{n,i}(k)$ is a carrier frequency adjustment request value transmitted by the node n to the node i at the k-th updating point in time, and $N_{\delta_{n,i}}(k)$ is a number of times of calculating an average value of frequency offsets by the node n with respect to the node i at the k-th updating point in time.

Thereafter, the node i calculates a final frequency offset value ($\hat{f}_{i,n}(k)$) with respect to the node n on the basis of the received $q_{n,i}(k-1)$ and $N_{\delta_{n,i}}(k-1)$ and the previously calculated average value ($\tilde{f}_{i,m}(k)$) of frequency offset (S307).

Here, $\delta_{n,i}(k)$ may be determined in the relationship between the node n and node i. Namely, in a case in which the node i has received only preambles more than a predetermined number of times ($R_{th}$), but not a carrier frequency adjustment request value, from the node n, $\delta_{n,i}(k)$ may be determined as 0, and in a case in which the node i has received a carrier frequency adjustment request value but not preambles more than the predetermined number of times, $\delta_{n,i}(k)$ may be determined as 1.

Also, in a case in which the node i has received the carrier frequency adjustment request value and preambles as well more than the predetermined number of times, $\delta_{n,i}(k)$ may be determined as a certain value between 0 and 1, and in this case, $\delta_{n,i}(k)$ may be determined according to Equation 1 shown below.

$$\delta_{n,i}(k-1) = \frac{N_{\delta_{n,i}}(k-1)}{1 + N_{\delta_{n,i}}(k-1)} \quad \text{(Equation 1)}$$

Finally, the node i calculates an adjustment value ($\Delta f_i(k)$) of carrier frequencies with respect to all the nodes included in the set $\xi_i$ by using the final frequency offset value ($\hat{f}_{i,n}(k)$) with respect to the node n, and adjusts a carrier frequency thereof (S308). Here, $N_{\xi_i}$ is a number of nodes included in the node set $\xi_i$.

As described above, the node i adjusts a carrier frequency thereof by using the adjustment value ($\Delta f_i(k)$) of the finally calculated carrier frequency, so as to be synchronized with a carrier frequency of the network it has newly entered.

Also, the node i may calculate a difference between the adjustment value ($\Delta f_i(k)$) of the carrier frequency and the final frequency offset value ($\hat{f}_{i,n}(k)$) with respect to the node n to calculate a carrier frequency adjustment request value ($q_{i,n}(k)$) (S309), and transmit the carrier frequency adjustment request value ($q_{i,n}(k)$) with respect to the node n and the number ($N_{\delta_{i,n}}(k)$) of times of calculating an average value of frequency offsets to the node n (S310). In an embodiment of the present invention illustrated in FIG. 3, the node n and node m are the same.

Meanwhile, in the pseudocode 1, the set and may become sets $\phi_i$ and $\phi_i$, respectively. In this case, $\phi_i$ and $\phi_i$ are a set of nodes belonging to a higher group of the sets $\zeta_i$ and $\xi_i$ when the distributed network according to an embodiment of the present invention has a hierarchical structure. Here, the higher group may be a set of a node including a global positioning system (GPS) and a node synchronized with the node including a GPS.

In this case, the pseudocode 1 may be expressed by a pseudocode 1-1.

---

<Pseudocode 1-1>

1: for every m ∈ $\phi_i$ do
2:
$$\text{Calculate } \tilde{f}_{i,m}(k) = \frac{\sum_{r=1}^{R_m} \tilde{f}_{i,m}^{[r]}(k)}{R_m}$$
3:   Update $N_{\delta_{i,m}}(k) = N_{\delta_{i,m}}(k-1) + 1$
4: end for
5: for every n ∈ $\phi_i$ do
6:   Calculate $\hat{f}_{i,n}(k) = (1 - \delta_{n,i}(k)) \times \tilde{f}_{i,n}(k) + \delta_{n,i}(k) \times (q_{n,i}(k-1) - \Delta f_i(k-1))$
7: end for
8:
$$\text{Calculate } \Delta f_i(k) = \frac{\sum_{n \in \phi_i} \hat{f}_{i,n}(k)}{N_{\phi_i} + 1}$$
9: for every n ∈ $\phi_i$ do
10:  Calculate $q_{i,n}(k) = \Delta f_i(k) - \hat{f}_{i,n}(k)$
11: end for

---

Figure 4:
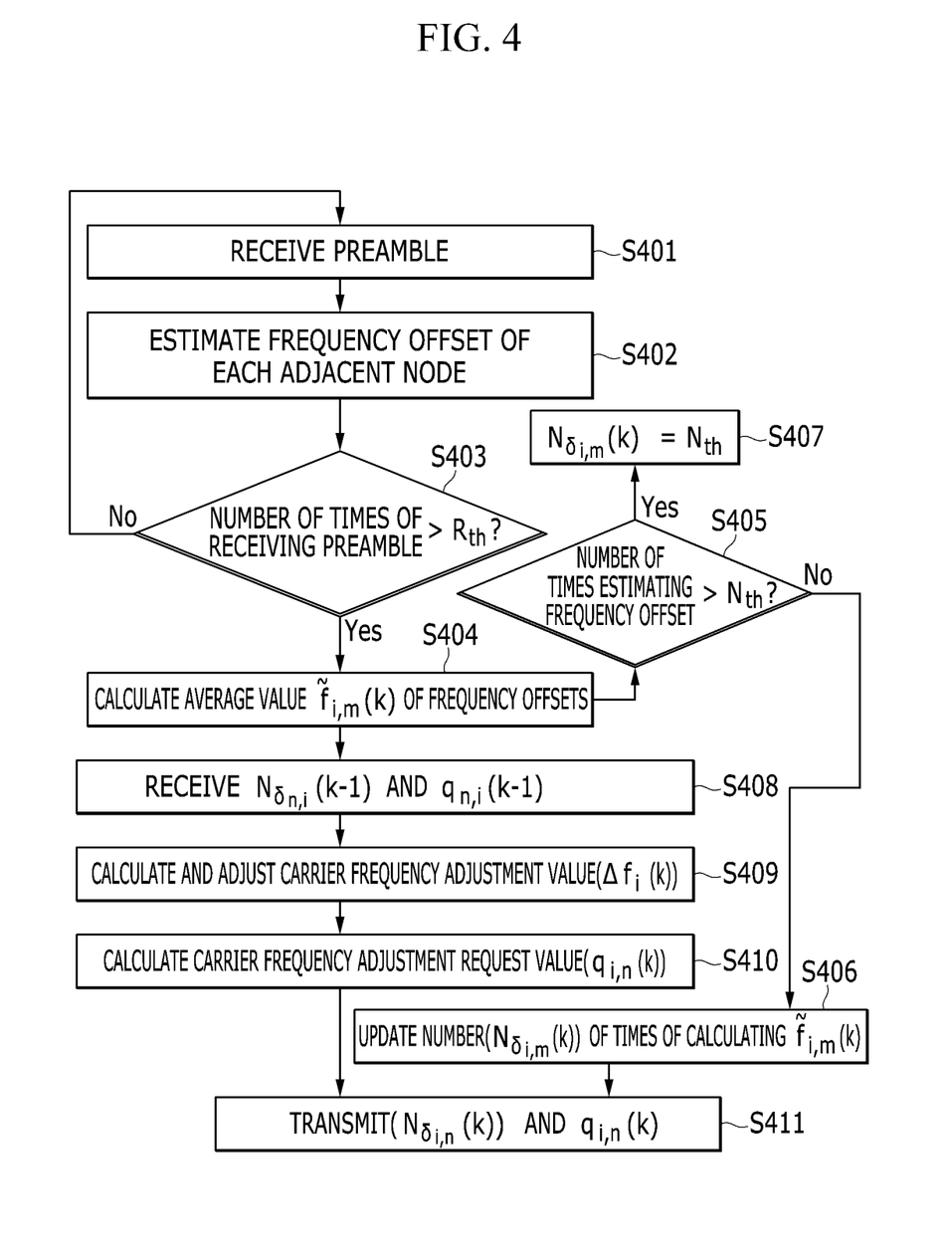
FIG. 4 is a flowchart illustrating a process of synchronizing a frequency performed in the node i by limiting the number of times of calculating an average value of frequency offsets according to another embodiment of the present invention.

FIG. 4 is a flowchart illustrating a process of synchronizing a frequency performed in the node i by limiting the number of times of calculating an average value of frequency offsets according to another embodiment of the present invention.

In a pseudocode 2 below, the number of times of calculating an average value of frequency offsets counted by the node i may be updated by only the predetermined number of times, in order to reduce overhead during the process of frequency synchronization.

Hereinafter, a process of performing, by a particular node included in a distributed network, frequency synchronization with low overhead will be described with reference to FIG. 4 and through the pseudocode 2.

---

<Pseudocode 2>

1: for every m ∈ $\zeta_i$ do
2:
$$\text{Calculate } \tilde{f}_{i,m}(k) = \frac{\sum_{r=1}^{R_m} \tilde{f}_{i,m}^{[r]}(k)}{R_m}$$
3:   if $N_{\delta_{i,m}}(k-1) < N_{th}$
4:     Update $N_{\delta_{i,m}}(k) = N_{\delta_{i,m}}(k-1) + 1$
5:   else
6:     fix $N_{\delta_{i,m}}(k) = N_{th}$ for k' ≥ k
7:   end if
8: end for
9: for every n ∈ $\xi_i$ do
10:  Calculate $\hat{f}_{i,n}(k) = (1 - \delta_{n,i}(k)) \times \tilde{f}_{i,n}(k) + \delta_{n,i}(k) \times (q_{n,i}(k-1) - \Delta f_i(k-1))$
11: end for
12:
$$\text{Calculate } \Delta f_i(k) = \frac{\sum_{n \in \xi_i} \hat{f}_{i,n}(k)}{N_{\xi_i} + 1}$$
13: for every n ∈ $\xi_i$ do
14:  Calculate $q_{i,n}(k) = \Delta f_i(k) - \hat{f}_{i,n}(k)$
15: end for

---

In pseudocode 2, whenever the node i receives a preamble from the node m (S401), the node i estimates a frequency offset of the node m (S402). $\tilde{f}_{i,m}^{[r]}(k)$ is a value obtained by temporarily estimating a frequency offset of the node m as shown in the pseudocode 1.

Thereafter, when the node i has received preambles more than the predetermined number of times ($R_{th}$) (S403), the node i calculates an average value ($\tilde{f}_{i,m}(k)$) of the frequency offsets primarily estimated on the basis of the number ($R_m$) of times of receiving preambles from the adjacent node m until then (S404). $\hat{f}_{i,m}(k)$ is also a value obtained by finally estimating a frequency offset of the node m as shown in the pseudocode 1.

However, unlike the pseudocode 1, in the algorithm proposed by the pseudocode 2, updating of the number ($N_{\delta_{i,m}}(k)$) of times of calculating an average value of frequency offsets is limited (S405). Namely, when $N_{\delta_{m,i}}(k-1)$ is smaller than the predetermined number ($N_{th}$), $N_{\delta_{m,i}}(k)$ is updated (S406), but if $N_{\delta_{m,i}}(k-1)$ is greater than the predetermined number ($N_{th}$), $N_{\delta_{i,m}}(k)$ is not updated or transmitted any longer. Thus, in the case of $N_{\delta_{m,i}}(k-1) \geq N_{th}$, $N_{\delta_{i,m}}(k)$ is fixed as a constant ($N_{\delta_{i,m}}(k) = N_{th}$) (S407).

Thereafter, an adjustment value ($f_i(k)$) of the carrier frequency and a carrier frequency adjustment request value ($q_{i,m}(k)$) are calculated and transmitted to a different node as proposed in the pseudocode 1 (S408 to S411).

Figure 5:
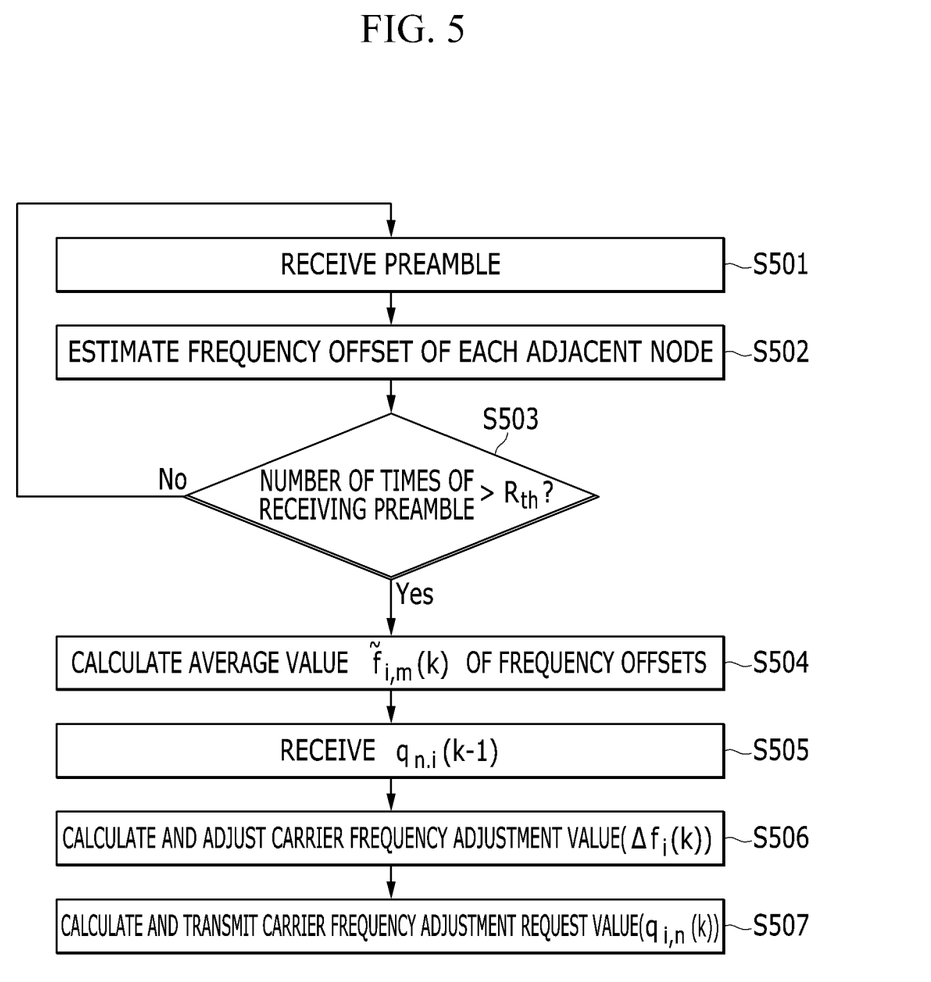
FIG. 5 is a flowchart illustrating a process of synchronizing a frequency performed in the node i without updating the number of times of calculating an average value of frequency offsets according to another embodiment of the present invention.

FIG. 5 is a flowchart illustrating a process of synchronizing a frequency performed in the node i without updating the number of times of calculating an average value of frequency offsets according to another embodiment of the present invention.

In a pseudocode 3 below, rather than counting the number ($N_{\delta_{i,m}}(k)$) of times of calculating an average value of frequency offsets and transmitting the same, $\delta_{n,i}(k)$ calculated by using the number ($N_{\delta_{i,m}}(k)$) of times of calculating an average value of frequency offsets may be fixed as a constant ($\delta_{fix}$) in order to reduce overhead during a process of frequency synchronization.

Hereinafter, a process of performing, by a particular node included in a distributed network, frequency synchronization with low overhead will be described with reference to FIG. 5 and through the pseudocode 3 shown below.

<Pseudocode 3>

1: for every $m \in \zeta_i$ do
2:
$$\text{Calculate } \tilde{f}_{i,m}(k) = \frac{\sum_{r=1}^{R_m} \tilde{f}_{i,m}^{[r]}(k)}{R_m}$$
3: end for
4: for every $n \in \xi_i$ do
5:  Calculate $\hat{f}_{i,n}(k) = (1 - \delta_{fix}(k)) \times \hat{f}_{i,n}(k) + \delta_{fix}(k) \times (q_{n,i}(k-1) - \Delta f_i(k-1))$
6: end for
7:
$$\text{Calculate } \Delta f_i(k) = \frac{\sum_{n \in \xi_i} \hat{f}_{i,n}(k)}{N_{\xi_i} + 1}$$
8: for every $n \in \xi_i$ do
9:  Calculate $q_{i,n}(k) = \Delta f_i(k) - \hat{f}_{i,n}(k)$
10: end for In the pseudocode 3, whenever the node i receives a preamble from the node m (S501), the node i primarily estimates a frequency offset of the node m (S502). $\tilde{f}_{i,j}^{[r]}(k)$ is a value obtained by temporarily estimating a frequency offset of the node m as shown in the pseudocode 1.

Thereafter, when the node i has received preambles at more than the predetermined number of times ($R_{th}$) (S503), the node i calculates an average value of the frequency offsets primarily estimated on the basis of the number ($R_m$) of times of receiving preambles from the adjacent node m until then (S404).

Namely, the average value $\tilde{f}_{i,m}(k)$ of the primarily estimated offset values is a value obtained by finally estimating the frequency offsets of the node m at the k-th updating point in time after the node i receives preambles from the node m $R_m$ times. Thereafter, a final frequency offset value ($\hat{f}_{i,m}(k)$) with respect to the node m is calculated on the basis of the average value ($\tilde{f}_{i,m}(k)$) of the estimated frequency offsets.

Here, in the algorithm proposed by the pseudocode 3, the number of times of calculating the average value of frequency offsets is not updated, and thus, the constant ($\delta_{fix}$) is used in the calculation of the adjustment value ($\Delta f_i(k)$) of the carrier frequency.

Namely, since the node i calculates the adjustment value of the carrier frequency by using the constant $\delta_{fix}$, resources consumed for counting the number ($N_{\delta_{i,m}}(k)$) of times of calculating an average value of frequency offsets and calculating $\delta_{n,i}(k)$ can be reduced.

Thereafter, the node i calculates the adjustment value ($\Delta f_i(k)$) of the carrier frequency by using $\hat{f}_{i,n}(k)$, $\delta_{fix}$, and the carrier frequency adjustment value request value ($q_{n,i}(k-1)$) received from the node n, and adjusts a frequency according to the calculated adjustment value of the carrier frequency (S506).

Thereafter, the node i calculates a carrier frequency adjustment request value ($q_{i,n}(k)$) from the adjustment value ($\Delta f_i(k)$) of the carrier frequency and the average value of frequency offsets as shown in the pseudocode 1, and transmits the same to the node n (S507).

Figure 6:
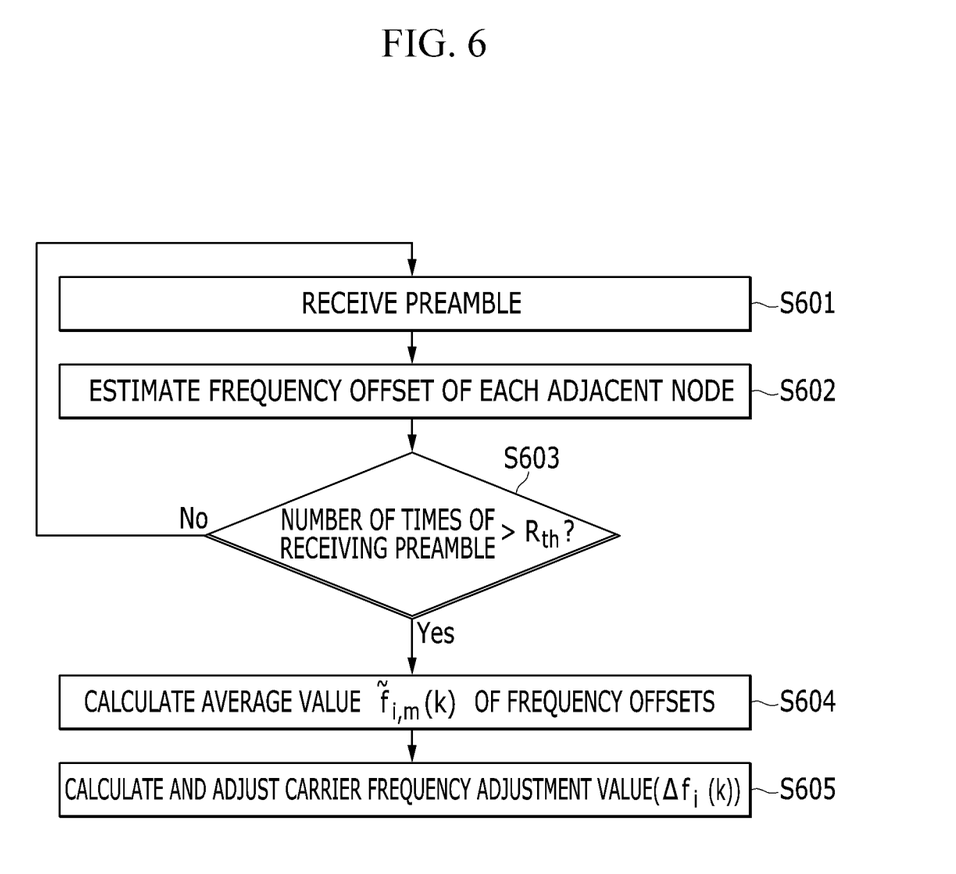
FIG. 6 is a flowchart illustrating a process of synchronizing a frequency performed in the node i according to another embodiment of the present invention.

FIG. 6 is a flowchart illustrating a process of synchronizing a frequency performed in the node i according to another embodiment of the present invention.

In a pseudocode 4 below, the node i receives a preamble from the node m and adjusts a carrier frequency, and does not transmit the carrier frequency adjustment request value ($q_{i,n}(k)$) and the number ($N_{\delta_{i,n}}(k)$) of times of calculating an average value of frequency offsets to the node n.

<Pseudocode 4>

1: for every $m \in \zeta_i$ do
2:
$$\text{Calculate } \tilde{f}_{i,m}(k) = \frac{\sum_{r=1}^{R_m} \tilde{f}_{i,m}^{[r]}(k)}{R_m}$$
3: end for
4:
$$\text{Calculate } \Delta f_i(k) = \frac{\sum_{m \in \zeta_i} \tilde{f}_{i,m}(k)}{N_{\zeta_i} + 1}$$

Referring to FIG. 6, whenever the node i receives a preamble from the node m (S601), the node i primarily estimates a frequency offset of the node m to calculate $\tilde{f}_{i,m}^{[r]}(k)$ (S602). The node m is one of nodes included in the set $\zeta_i$ and the node i.

The node i calculates a carrier frequency adjustment value ($\Delta f_i(k)$) with respect to every node included in the set $\zeta_i$ on the basis of the calculated $\tilde{f}_{i,m}^{[r]}(k)$ (S604) to adjust a frequency thereof (S605), thus performing synchronization between the nodes.

According to an embodiment of the present invention, a node which has entered a distributed network can be synchronized with a carrier frequency of the network the node has newly entered, by adjusting a carrier frequency thereof through a method such as the proposed algorithm. Also, in a case in which a frequency is required to be periodically synchronized, respective nodes in a distributed network can synchronize a carrier frequency thereof with a neighboring node with low overhead.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of frequency synchronization of a node entering a distributed network, the method comprising:
   receiving preambles from a plurality of neighbor nodes adjacent to the node, the node and the plurality of neighbor nodes receiving and transmitting data therebetween using orthogonal frequency division multiple (OFDM) access;

estimating offsets of carrier frequencies from the received preambles, for each of the plurality of neighbor nodes;

calculating an average value of the estimated offsets;

receiving an adjustment request value of the carrier frequencies that is calculated from the plurality of neighbor nodes;

calculating an adjustment value of the carrier frequencies with respect to the entirety of the plurality of neighbor nodes based on the average value and the adjustment request value; and adjusting a carrier frequency of the node on the basis of the adjustment value, wherein each of the plurality of neighbor nodes is a node that has transmitted the preamble that is received more than a predetermined number of times by the node.

2. The method of claim 1, wherein each of the neighbor node is a node including a global positioning system (GPS) or a node synchronized with the node including a GPS, when the distributed network has a hierarchical structure.

3. The method of claim 1, further comprising calculating another adjustment request value of the carrier frequencies through the adjustment value and the average value, and transmitting the calculated adjustment request value.

4. The method of claim 3, wherein the calculating an average value of the estimated offsets includes calculating the average value a number of times, and the method further includes:

updating the number of times of calculating the average value of the offsets; and transmitting the updated number of times of calculating the average value.

5. The method of claim 4, wherein the calculating of the adjustment value comprises:

receiving the adjustment request value calculated by a first node from the first node, wherein the first node is one of the plurality of neighbor nodes;

receiving the number of times of calculating the average value of the offsets updated by the first node from the first node;

calculating a final frequency offset value with respect to the first node by using a delta ($\delta$) value calculated from the received number of times of calculating the average value of the offsets, the received adjustment request value, and the average value; and calculating an adjustment value of the carrier frequencies with respect to the entirety of the plurality of neighbor nodes by using the final frequency offset value.

6. The method of claim 4, further comprising when the number of times of calculating the average value of the offsets exceeds a pre-set number, fixing the number of times of calculating the average value to a constant ($N_{th}$).

7. The method of claim 6, wherein the calculating of the adjustment value comprises:

receiving the adjustment request value calculated by a first node from the first node, wherein the first node is one of the plurality of neighbor nodes, calculating a final frequency offset value with respect to the first node by using a delta ($\delta$) value calculated from the fixed number of times of calculating the average value of the offsets, the received adjustment request value, and the average value; and calculating an adjustment value of the carrier frequencies with respect to the entirety of the plurality of neighbor nodes by using the final frequency offset value.

8. An apparatus for synchronizing a carrier frequency of a node included in a distributed network, the apparatus comprising:

a processor, and a memory containing program instructions stored therein, execution of which by the processor causes the apparatus to provide the functions of:

a communicating unit configured to receive preambles from a plurality of neighbor nodes adjacent to the node using orthogonal frequency division multiple (OFDM) access;

a frequency offset estimating unit configured to estimate an offset of the carrier frequency from the received preambles for each of the plurality of neighbor nodes;

an offset average value calculating unit configured to calculate an average value of the estimated offsets;

a frequency adjustment value calculating unit configured to calculate an adjustment value of the carrier frequencies with respect to the entirety of the plurality of neighbor nodes based on the average value;

a frequency adjusting unit configured to adjust the carrier frequency of the node on the basis of the adjustment value; and an adjustment request value calculating unit configured to calculate an adjustment request value of carrier frequencies through the adjustment value and the average value, and transmit the calculated adjustment request value, wherein each of the plurality of neighbor nodes is a node that has transmitted the preamble more than a predetermined number of times.

9. The apparatus of claim 8, wherein each of the neighbor node is a node including a global positioning system (GPS) or a node synchronized with the node including a GPS, when the distributed network has a hierarchical structure.

10. The apparatus of claim 8, wherein the functions further include a function of a number calculating unit configured to update the number of times of calculating an average value of the offsets and transmit the updated number of times of calculating the average value.

11. The apparatus of claim 10, wherein the adjustment value calculating unit receives the adjustment request value calculated by a first node from the first node, wherein the first node is one of the plurality of neighbor nodes, receives the number of times of calculating the average value of the offsets updated by the first node from the first node, calculates a final frequency offset value with respect to the first node by using a delta ($\delta$) value calculated from the received number of times of calculating the average value of the offsets, the received adjustment request value, and the average value, and calculates an adjustment value of the carrier frequencies with respect to the entirety of the plurality of neighbor nodes by using the final frequency offset value.

12. The apparatus of claim 10, wherein when the number of times of calculating the average value of the offsets exceeds a pre-set number, the number calculating unit fixes the number of times of calculating the average value to a constant ($N_{th}$).

13. The apparatus of claim 12, the adjustment value calculating unit receives the adjustment request value calculated by a first node from the first node, wherein the first node is one of the plurality of neighbor nodes, calculates a final frequency offset value with respect to the first node by using a delta (δ) value calculated from the fixed number of times of calculating the average value of the offsets, the received adjustment request value, and the average value, and calculates an adjustment value of the carrier frequencies with respect to the entirety of the plurality of neighbor nodes by using the final frequency offset value.

\* \* \* \* \*